Feb. 9, 1926.
P. BURKE
1,572,227
CLUTCH MECHANISM
Filed August 1, 1924
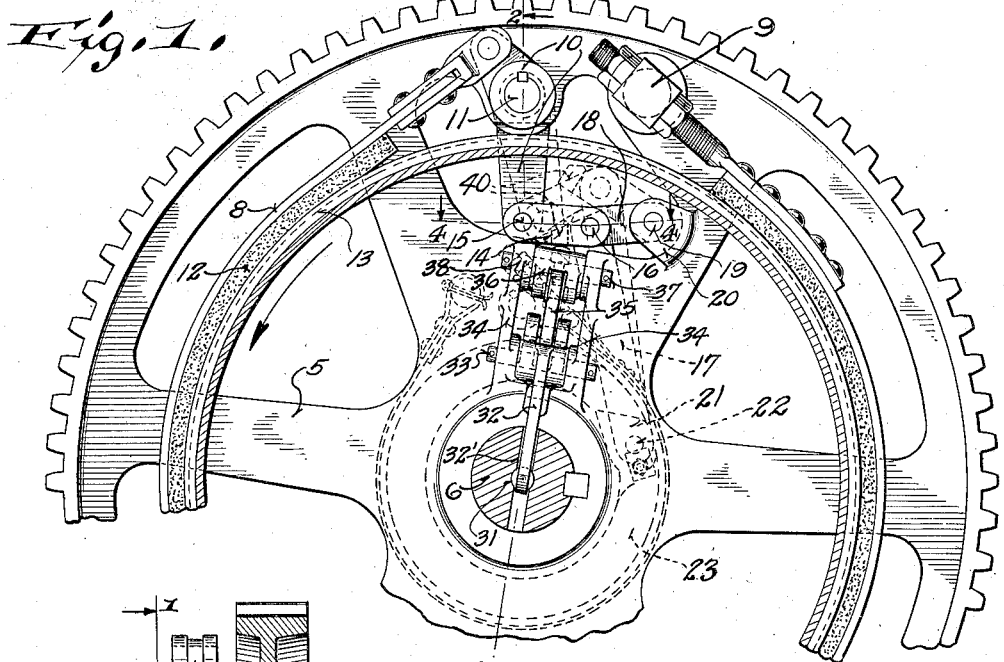
INVENTOR.
Paul Burke
BY
Quarles & French
ATTORNEYS Patented Feb. 9, 1926.

1,572,227

UNITED STATES PATENT OFFICE.

PAUL BURKE, OF GREEN BAY, WISCONSIN, ASSIGNOR TO NORTHWEST ENGINEERING COMPANY, OF GREEN BAY, WISCONSIN, A CORPORATION OF WISCONSIN.

CLUTCH MECHANISM.

Application filed August 1, 1924. Serial No. 729,497.

*To all whom it may concern:*

Be it known that I, PAUL BURKE, a citizen of the United States of America, and resident of Green Bay, in the county of Brown and State of Wisconsin, have invented new and useful Improvements in Clutch Mechanism, of which the following is a description, reference being had to the accompanying drawings, which are a part of this specification.

The invention relates to clutch mechanism.

In many forms of mechanism there are clutches to be operated which in certain application involve a greater degree of muscular effort than the average man is capable of without undue fatigue. The object of this invention is to provide a clutch mechanism in which the operator's effort is supplemented by the action of a servo-clutch mechanism for actuating the main clutch mechanism. With servo-clutch mechanism, however, it is highly desirable to prevent wear thereof when the main clutch mechanism has been thrown in and to relieve the operator of having to continue to apply the servo-clutch mechanism after the main clutch is engaged. This problem is solved in the present instance, in such applications as use a "locked in" main clutch, by the combination with such main clutch mechanism of a servo-clutch mechanism for bringing about the application of said main clutch mechanism and a positive release for the main clutch mechanism. In case the main clutch mechanism is not designed or adjusted to be "locked in," the positive manually-operated release of the main clutch mechanism is also of advantage for certain classes of work.

A further object of the invention is to provide a simple control for the clutch mechanism by the use of a single control which the operator moves in one direction to apply the servo-clutch mechanism and in the opposite direction to positively release the main clutch mechanism.

The invention further consists in the several features hereinafter set forth and more particularly defined by claims at the conclusion hereof.

In the drawings: Fig. 1 is a sectional view of clutch mechanism embodying the invention, taken on the line 1—1 of Fig. 2, parts being broken away;

Fig. 2 is a side elevation and sectional view, taken partly in section on the line 2—2 of Fig. 1;

Fig. 3 is a detail elevation view of parts of the servo-clutch mechanism and control;

Fig. 4 is a view, generally in section, taken on the line 4—4 of Fig. 1.

In the drawings the numeral 5 designates a member, here shown as a gear, keyed or otherwise connected to revolve with a shaft 6 to which a drum 7 or other part to be driven is to be clutched, said shaft being suitably supported in bearings on the frame of the machine.

The main clutch mechanism, preferably of the band type, is carried by the member 5 and engageable with a part secured to or formed integral with the drum 7. As herein shown, the main friction clutch band 8 has one end suitably anchored at 9 to the member 5 and its other end connected to the shorter arm of a built-up rocker lever 10 which has a pin portion 11 pivotally mounted in the member 5. As thus mounted, the band 8, preferably provided with a suitable lining 12, cooperates with a friction surface 13, here shown as forming part of a flanged extension of the drum 7. It will, of course, be understood that the member 5 does not have to be a gear, as the shaft 6 may be otherwise driven to rotate the member 5 with it.

The longer arm of the rocker lever 10 is pivotally connected to toggle bars 14, as by a pin 15, and said bars are connected by a pin 16 to one end of a tension bar 17 and a slotted toggle member 18 which is pivoted on a pin 19 carried by ears 20 on a spoke of the member 5.

The other end 21 of the tension bar 17 is connected by a pin 22 to a servo-drum 23 which may rotate with its bearing and is adapted to turn freely on the hub 24 of the member 5, subject only to the restraint offered by the tension bar 17.

The servo-mechanism also includes a suitably lined servo-friction band 25 acting upon the outer surface of the drum 23 and anchored at one end 26 to the frame (not shown) of the machine and at its other end connected by means of a T-bolt 27 to a rocker lever or arm 28 on a shaft 29 journalled in a part of the frame of the machine, the swinging of said shaft 29 in the proper direction causing an application of said band 25 to the drum 23. Upon such an application, with the shaft 6 rotating in the direction of the arrow, the rotation of the drum 23 will be stopped, or its speed slackened, with a resulting pull on the tension bar 17 which actuates the toggle members 14 and 18 and through them the rocker lever 10, causing it to apply the main clutch band to the surface 13. During such application the toggle levers or members 14 and 18 may be moved past center to the full-line position shown in Fig. 1, and the main clutch mechanism is thus "locked in," after which the operator may release the band 25 from the drum 23 without disengaging the main clutch and thus prevent undue wear of the servo-clutch parts and avoid further manual effort. In some classes of work the toggle levers are not adjusted to hold the clutch "locked in."

The positive release mechanism includes a shifter bar 30 slidably mounted in an axial bore 31 in the shaft 6, engageable with one arm of a rocker lever 32 pivotally mounted upon a pin 33 carried by lugs 34 on the member 5, said arm of lever 32 working in a slot 32′ in the shaft 6. The other arm of lever 32 is operatively connected by a link 35 and its pins with an arm of a stop and release lever 36. The lever 36 is pivoted on a pin 37 carried by lugs 38 on the member 5 and has threaded into its other arm an adjustable stop-screw 39 adapted to be engaged by a lug 40 formed as an extension of the toggle member 18.

Upon making a clutch application the screw 39 engaged by the lug 40 limits the movement of the toggle in the clutched position. For positively releasing the main clutch mechanism the inward shifting of the bar 30 swings the inner arm of lever 32 toward the drum which through the link 35 swings the lever 36 so that its stop-screw 39 engages with the lug 40 and swings the toggles outwardly, as shown in the dotted line position in Fig. 1, thereby releasing the main clutch mechanism through the movement of the lever 10 to a release position.

The control is designed to effect both the operation of the servo-band and the shifter bar 30. To this end the shaft 29 has an arm 41 operatively connected by a link 42 to a pin 43 carried in arms 44 of a control member 45 pivoted on a relatively fixed shaft 46. This member 45 also has an arm 47 engageable with that end of the bar 30 which projects beyond the end of the shaft 6. This control member may be turned and maintained in different positions by a lever or pedal associated with a link 48. Turning the member 45 to apply the servo-band 25 moves the arm 47 outwardly so that the release mechanism does not interfere with the clutch application, and turning said member in the opposite direction first releases the servo-band and then arm 47 actuates the bar 30 so as to effect a positive release of the main clutch mechanism.

The stop position of lever 36 is maintained independent of the shifter bar 30 by the provision of a stop portion 49 engageable with the front face 50 of the hub 24 of the member 5.

Thus the gear or member 5 being in rotation, the operator, in order to engage the main clutch mechanism, applies the servo-band 25 to the drum 23 by the swinging of the member 45 in one direction, thereby stopping or retarding the rotation of said drum 23 relative to the driver 5 and placing a tension upon the bar 17, which then acts as heretofore described to move the toggles to produce an engagement of the band 8 with the drum or surface 13, the movement of the toggle members 14 and 18 being limited either by the increase in tension in the movable end of the band 8 or by contact of the lug 40 with the stop-screw 39. I prefer to have the stop-screw 39, for most applications, so adjusted that lug 40 will come into contact with it just after pin 16 has passed a straight line connecting pins 15 and 19. With the adjustment so made, the main clutch will remain engaged after tension in the servo-band 25, and hence in the bar 17, has been removed. When the stop-screw 39 is engaged by lug 40 with the main clutch "in" said screw 39 is held in a "stop" position by engagement of part 49 with the front face 50 of the hub 24. In those instances where the toggle members do not hold the clutch "locked in" but simply move to a substantially straight-line position to engage the stop-screw 39, the release mechanism herein shown and described is also of advantage because it insures a positive release of the main clutch band by the operator.

If now the operator desires to disengage the clutch, he merely reverses the direction of motion of manually-controlled linkage and thereby swings the control member 45 in the opposite direction to cause the arm 47 to engage and move the bar 30 inwardly, which, through the lever 32, link 35 and lever 36, causes an outward movement of the screw 39 and hence an outward movement of the toggle mechanism through contact of screw 39 with lug 40 to a release position, with the consequent swinging of the lever 10 to dotted-line clutch "release" position shown in Fig. 1.

I desire it to be understood that this invention is not to be limited to any specific form or arrangement of parts except as such limitations are specified in the claims or necessitated by the prior art.

What I claim as my invention is:

1. In a clutch mechanism, the combination with a driving member and a member to be driven, of a main clutch mechanism for drivingly connecting said members together, a servo-friction clutch mechanism including a drum revolving with and rotatable relative to said driving member and operatively connected to said main clutch mechanism to move the same to clutched position, and manually-operated means for positively releasing said main clutch mechanism.

2. In a clutch mechanism, the combination with a driving member and a member to be driven, of a main clutch mechanism for drivingly connecting said members together, a servo-friction clutch mechanism including a friction band and a drum revolving with and rotatable relative to said driving member and operatively connected to said main clutch mechanism to move the same to clutched position, means for applying said band to said servo-drum, means for positively releasing said main clutch mechanism, and manually-operated means including a control member associated with said servo-band-applying means and said positive release means to actuate the same.

3. In a clutch mechanism, the combination with a driving member and a member to be driven, of a main clutch mechanism including a friction band engageable with the member to be driven and a toggle mechanism for moving and holding said band in clutched engagement with said member, a servo-friction clutch mechanism including a drum revolving with and rotatable relative to said driving member and operatively connected with said toggle mechanism to actuate the same, and manually-operated means engageable with said toggle mechanism to move the same to positively release said main clutch friction band.

4. In a clutch mechanism, the combination with a member to be driven and a driving member, of a main clutch mechanism including a friction band carried by said driving member and engageable with the member to be driven and a toggle mechanism for moving said band into clutched engagement with said member. A servo-friction clutch mechanism including a drum revolving with and rotatable relative to said driving mechanism and operatively connected with said toggle mechanism to actuate the same, a release lever forming a stop for the "clutched" position of said toggle mechanism and operable thereon to release said main clutch friction band, and manually-operated means for actuating said release lever.

5. In a clutch mechanism, the combination with a member to be driven and a driving member including a shaft provided with an axial bore, of a main clutch mechanism including a friction band carried by said driving member and engageable with the member to be driven and a toggle mechanism for moving said band into clutched engagement with said member, a servo-friction clutch mechanism including a drum revolving with and rotatable relative to said driving mechanism and operatively connected to said toggle mechanism to actuate the same and a servo-friction band engageable with the drum, a release lever engageable with said toggle mechanism to release said main clutch friction band, a shifter bar working in the bore of said shaft and operatively connected with said release lever, and a manually-operable member operatively connected with said servo-friction band and movable in one direction to apply said band and in another direction to release said band and actuate said shifter bar.

6. In a clutch mechanism, the combination with a member to be driven and a driving member including a shaft provided with an axial bore, of a main clutch mechanism including a friction band carried by said driving member and engageable with the member to be driven and a toggle mechanism for moving and holding said band in clutched engagement with said member, a servo-friction clutch mechanism including a drum revolving with but free of said driving mechanism and operatively connected to said toggle mechanism to actuate the same and a servo-friction band engageable with the drum, a release lever having an adjustable stop engageable with said toggle mechanism to limit its movement and to release said main-clutch friction band, a shifter bar working in the bore of said shaft and operatively connected with said release lever, and a manually-operable member operatively connected with said servo-friction band and movable in one direction to apply said band and in another direction to release said band and actuate said shifter bar.

In testimony whereof, I affix my signature.

PAUL BURKE.